March 3, 1959 N. C. UPDEGRAFF 2,876,071
METHOD FOR PRODUCING HYDROGEN SULFIDE BY SYNTHESIS
Filed May 31, 1955 3 Sheets-Sheet 2

INVENTOR
NORMAN C. UPDEGRAFF
BY W E Sherwood
ATTORNEY

March 3, 1959 N. C. UPDEGRAFF 2,876,071
METHOD FOR PRODUCING HYDROGEN SULFIDE BY SYNTHESIS
Filed May 31, 1955 3 Sheets-Sheet 3

INVENTOR.
NORMAN C. UPDEGRAFF
BY W E Sherwood
ATTORNEY

United States Patent Office 2,876,071
Patented Mar. 3, 1959

2,876,071

METHOD FOR PRODUCING HYDROGEN SULFIDE BY SYNTHESIS

Norman C. Updegraff, Louisville, Ky., assignor to Chemetron Corporation, a corporation of Delaware Application May 31, 1955, Serial No. 512,151

12 Claims. (Cl. 23—181)

This invention relates generally to the production of hydrogen sulfide by synthesis from its elements and more particularly to an improved process wherein the compound may be produced more economically and with reduced hazards of production.

In the copending application of William W. Roberts, Jr., Serial No. 497,217, filed March 28, 1955, an improved process of producing hydrogen sulfide by synthesis is disclosed. In that process, through utilization of the exothermic heat of reaction in the region of its evolution, a high yield of the compound is made possible by a hot gas phase reaction.

In comparison, the method of the present invention not only utilizes certain advantageous features taught in the Roberts invention, but also provides an improved thermal efficiency. In particular, my invention is characterized by a saving in fuel in that no additional external heat is required during a production run; by a saving in cooling medium in that the produced gases require a minimum of final cooling, and by improved safety considerations in that a pressure vessel containing toxic and corrosive hydrogen sulfide is not required to be externally heated.

As one feature of the present invention a circulating body of molten sulfur, part of which attains a relatively low temperature and serves as a heat transfer medium without becoming unduly viscous, may be employed. The viscosity of sulfur has been studied by various investigators, notably Bacon and Fanelli, Journal American Chemical Society, 65, p. 639 (1943), who have found that the viscosity varies in an exceptional manner with temperature. With purified sulfur a maximum viscosity of about 932 poises was found to occur at 366–370° F. whereas at about 314° F. the viscosity was only about 8 poises, and at 480° F. the viscosity was about 150 poises, falling gradually with increasing temperature. The viscosity of pure sulfur also appears to be independent of the rate of heating and cooling and of the previous heat treatment of the sulfur.

However, when hydrogen sulfide is present in molten sulfur, having a temperature which normally would signify an extremely viscous state, the viscosity is lowered significantly. I have now discovered that this phenomenon may be utilized in connection with a circulating body of sulfur which serves to provide the sulfur used in the synthesis of the hydrogen sulfide and simultaneously serves to transfer heat from various process zones to other process zones. The resulting heat balance accordingly permits the savings in fuel and cooling medium above mentioned. Thus, in the present invention, the viscosity characteristics inherent in the sulfur bath present no operating problems and a continuous, thermally efficient process for manufacturing hydrogen sulfide by synthesis is feasible even when the sulmur passes through temperature ranges which normally would cause such sulfur to become too viscous for gas and liquid contact apparatus to handle.

One object of the invention is to provide a continuous process for producing hydrogen sulfide by synthesis, wherein virtually all of the available sensible heat of the synthesized gas is effectively recaptured and used to heat the synthesis reactants.

A second object is to provide an improved process for synthesizing hydrogen sulfide wherein the external heat requirement is substantially eliminated during the production run of the equipment.

A third object is to achieve a high degree of thermal efficiency in the manufacture of hydrogen sulfide by utilizing molten sulfur as a heat transfer medium.

Another object is to provide an improved system for the synthesis of hydrogen sulfide wherein the pressure reactor vessel need not be subjected to external heating.

Other objects and advantages will become more apparent when the following description is considered in conjunction with the accompanying drawings in which Fig 1 is a diagrammatic view showing a preferred arrangement of apparatus suitable for carrying out the process of the invention.

The exothermic reaction, $H_2+S=H_2S+heat$, has long been known and it has also been suggested by others that, in the production of hydrogen sulfide by synthesis from its elements, no additional source of heat need be employed after the exothermic reaction is initiated. Moreover, in the continuous process disclosed by Maude et al., 2,214,859, the use of an excess of sulfur in contact with the hydrogen present in the reaction zone is taught.

These prior teachings, however, to the best of my knowledge, fail to employ a circulating body of molten sulfur as a heat exchange medium which removes a substantial portion of the sensible heat from the product gas, which preheats the hydrogen gas and which may utilize any excess remaining heat for suitable supplementary plant purposes. I have discovered that any or all of these advantageous uses of the circulating sulfur may be obtained, even though the circulating sulfur moves through a portion of the apparatus in the temperature range which normally signifies an extremely viscous state.

Furthermore, the resulting system is easily controlled and is reliable in operation. Since the sulfur, gas and cooling medium all flow readily, conventional flow regulating equipment and pumps may be employed. The several heat transfers between these several process materials result in an effective utilization of heat which is controllable at all times.

Figure 1:
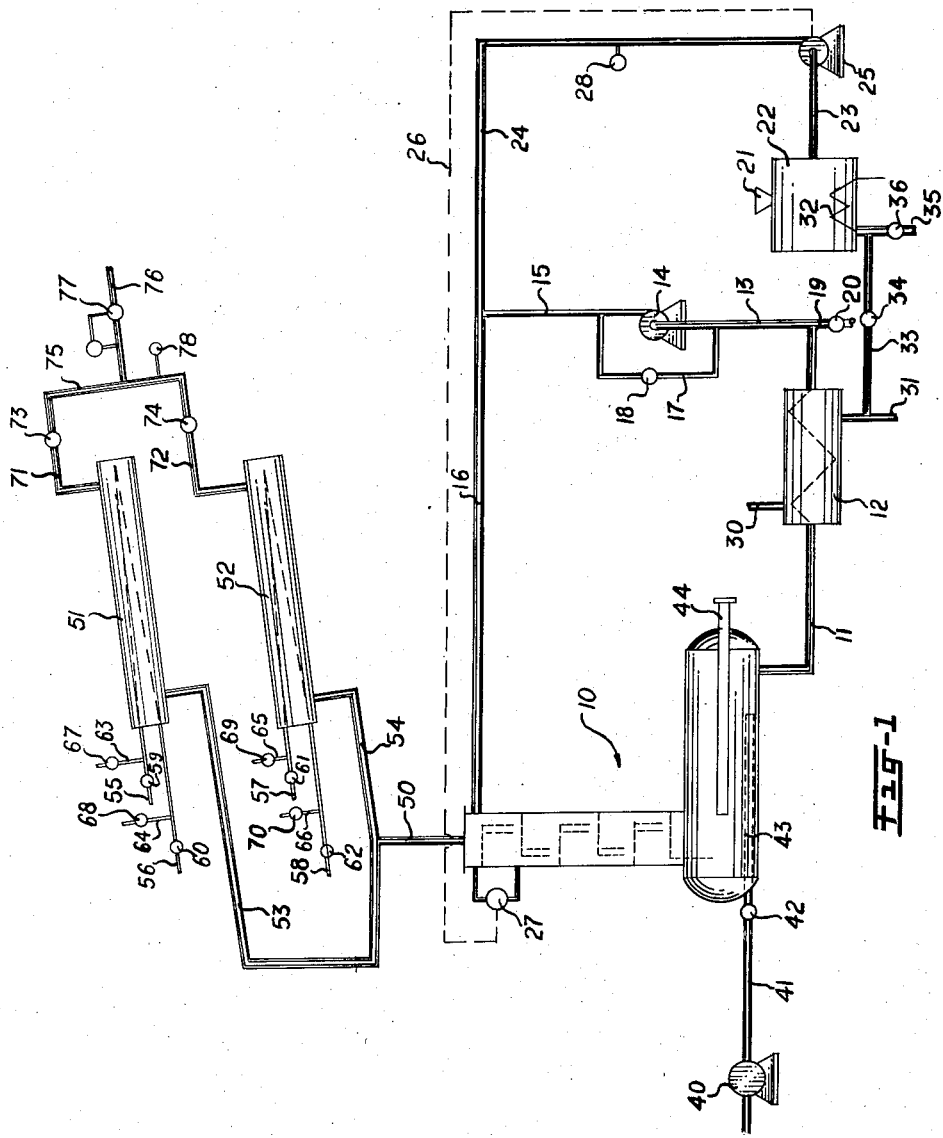

With these general considerations in mind reference now is made to Fig. 1 showing one arrangement of apparatus suitable for carrying out the process of the invention.

A reactor vessel, indicated generally at 10, is adapted to contain a circulating body of molten sulfur serving as a heat exchange medium and as a source of vaporized sulfur reactant. As an illustration of one set of satisfactory operating conditions using this apparatus, sulfur at about 850° F. and under a pressure of about 75 p. s. i. g. is led from the vessel through a conduit 11 into heat exchanger 12 in which it is cooled to about 260° F. Thereafter the cooled sulfur is led through conduit 13 into a suitable circulating pump 14 which forces it back into the top of the vessel through conduits 15 and 16. Pump 14 normally operates under a relatively small pressure head in the order of 25 p. s. i. g. and runs constantly. Its rate may be adjusted as desired in order to maintain a proper heat balance in the reactor vessel. For convenience, a bypass conduit 17 controlled by valve 18 and a drain outlet 19 controlled by valve 20 usually are employed.

By controlling the pumping rate of pump 14 a significant amount of control on the operation of the process can be obtained, as will be apparent to those skilled in the art. In general, a substantial excess of sulfur over and above the amount required for conducting a stoichiometric reaction, is required to be moved by this pump. For example, in one usage in which 61 pounds per hour of sulfur is converted into hydrogen sulfide, the circulating pump is operating at the rate of 132 pounds of sulfur per hour. Suitable pressure flow and temperature indicators, as well as pressure and temperature controllers, all of conventional construction, may be employed as desired, all at suitable locations in the system. These devices, of course, assist the operator in adjusting the pumping rate of the circulating pump in order to establish and maintain the desired output of hydrogen sulfide from the system as well as to indicate the conditions existing at the several locations in the system.

Make-up sulfur to replace the amount converted into hydrogen sulfide is supplied as a solid, through hopper 21, into a tank or pit 22 and is melted and heated to 260° F. after which it is moved through conduits 23 and 24 by pump 25 and thence mingles in conduit 16 with the circulating portion of the bath. Pump 25 may be operated intermittently, at automatically controlled rates, under the influence of any conventional control linkage 26 connected to a liquid level controller 27, which, in the type of vessel shown, may be located and adjusted to maintain vessel 10 in a flooded condition. Conventional instrumentation, such as a pressure gauge 28, may be employed as desired.

The heat removed from the hot sulfur entering heat exchanger 12 may be transferred to another medium such as low pressure steam entering the heat exchanger through conduit 30 and leaving through conduit 31. A heating coil 32 in tank 22 serves to heat the makeup sulfur and may receive its heat from the medium in outlet conduit 31 by means of a connecting conduit 33 controlled by valve 34. If desired, an alternative or additional source of heating medium may be supplied to coil 32 by conduit 35 controlled by valve 36 when for any reason the heat contained in the low pressure steam of conduit 33 is not to be fully used.

Heat removed from the hot sulfur in heat exchanger 12 may also be employed elsewhere in the production plant, if desired. The low pressure steam passing out from conduit 31 may, for example, be used for heating buildings, for use in other processes, or the like, thus contributing further to the efficient thermal utilization of the present invention.

As shown in Fig. 1 a compressor 40 is adapted to supply hydrogen gas at about atmospheric temperature into conduit 41 and through control valve 42 into a sparger pipe 43 located adjacent the bottom of the reactor vessel. Normally this gas is supplied under a pressure of about 100 p. s. i. g. and the sparger pipe is located beneath the surface of the molten sulfur as will later be described. As this gas rises through the preheating and reaction zones it is heated and is converted with sulfur vapors in a gas phase reaction into the product hydrogen sulfide. For the purpose of initial start up a suitable heater 44, such as an electrical immersion heater, may also be disposed in reactor vessel 10 for heating the initial sulfur charge to process temperatures.

As will later be noted, the hydrogen sulfide passing upward through the reactor structure attains a high temperature in certain zones within that structure and before leaving the reactor through outlet 50 transfers most of its sensible heat to incoming relatively cool molten sulfur. In general, the formed hydrogen sulfide together with any unreacted hydrogen gas and with a small amount of vaporized sulfur, leaves the reactor at about 275° F. and 75 p. s. i. g., in the example being described, and is diverted into one or the other of the gas coolers 51 and 52. These coolers preferably are of similar constructions and capacity, being designed for alternate usage. They preferably are inclined so that sulfur condensed therein may be drained back into conduit 50 and the reacting vessel through connecting conduits 53 and 54. Since liquid sulfur will solidify and cause plugging of conduits with consequent disruption of the process when its temperature drops below about 240° F., the conduits 50, 53 and 54 are steam jacketed and maintained above the solidifying temperature of the sulfur therein. Within each gas cooler a system of heat exchange piping is provided having cold water inlets 55, 57 and outlets 56, 58, and, respectively controlled by inlet valves 59 and 61 and by outlet valves 60 and 62. Moreover, leading into the same piping within the coolers are steam inlets 63, 65 and outlets 64, 66 and respectively controlled by inlet valves 67 and 69 and by outlet valves 68 and 70, respectively.

Product gas outlets 71 and 72, controlled by valves 73 and 74, respectively, lead into a header outlet 75. A system of outlet 76 controlled by a back pressure valve 77 of conventional construction connects with the header outlet on which a suitable pressure gauge 78 may be mounted.

By means of the described apparatus, the setting of pressure valve 77 determines the pressures which are maintained in the system as well as the pressure at which compressor 40 and sulfur pumps 14 and 25 must be operated. Since a small amount of relatively cool sulfur, below the viscous stage, condenses and solidifies in the coolers 51 and 52, it is preferable to operate the system by directing all of the gas stream from conduit 50 into a single cooler until an accumulation of solid sulfur occurs therein, after which the appropriate outlet valve may be closed and the gas stream directed into the companion cooler whose outlet meanwhile has been opened. It will be understood that when this reversal takes place the cooling water flow of the first cooler is interrupted and is replaced by a flow of steam which melts the solidified sulfur which then drains back through the inclined conduits into the reactor vessel. In this manner, the system by periodic reversals of heating and cooling in the exchangers 51 and 52 may be operated continuously and under a desirable constant pressure. Customarily the coolers have a cooling capacity sufficient to cool the hydrogen sulfide entering outlet 76 to about 100° F.

Figure 2:
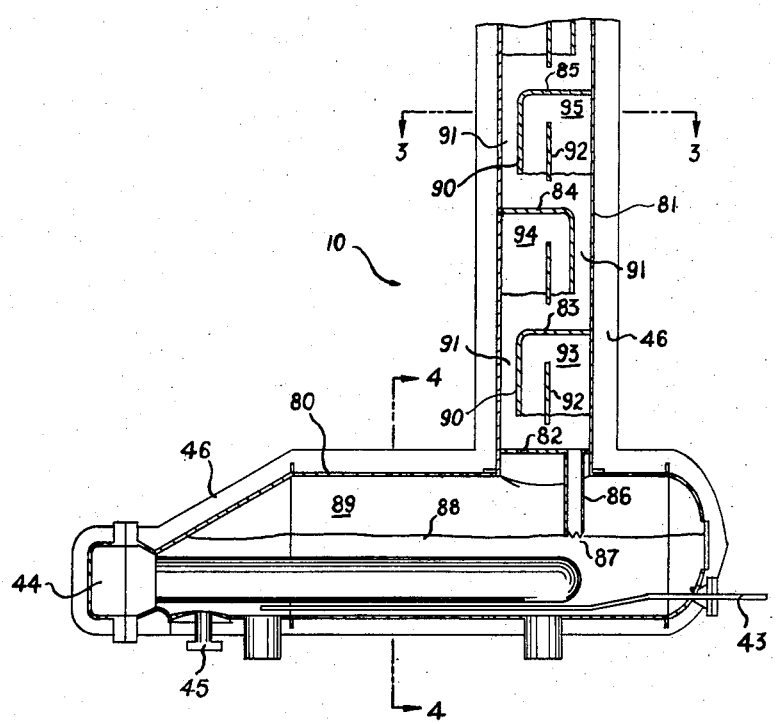
Fig. 2 is a sectional view of a portion of one form of reactor vessel suitable for use in carrying out the invention.
Figure 3:
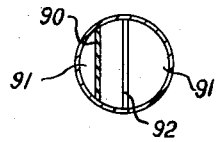
Fig. 3 is a sectional view taken on line 3—3 of Fig. 2.
Figure 5:
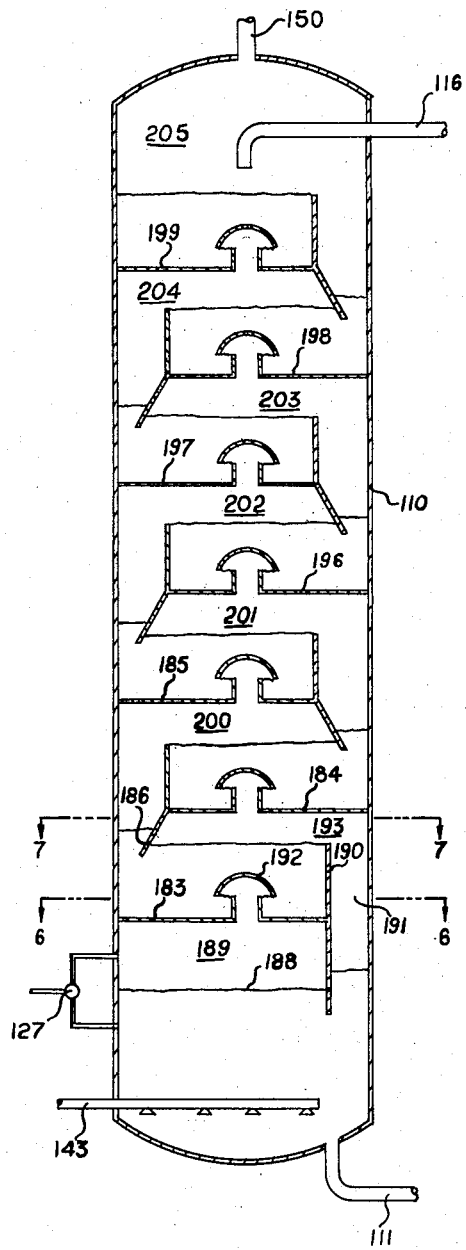
Fig. 5 is a sectional view of a portion of a second form of reactor vessel suitable for use in carrying out the invention.

Referring now to Fig. 2, a preferred form of reactor for carrying out the invention is shown, although the reactor of Fig. 5, or other forms of reactor such as a packed column type, may be used if desired. The reactor 10 may conveniently include a horizontally mounted lower portion 80, supporting a vertically mounted column portion 81 containing a plurality of spaced trays. I prefer to employ not less than six trays, four of which are shown in Fig. 2 as indicated at 82, 83, 84 and 85. From the lowermost tray 82, a downcomer indicated at 86, conveniently comprising a hollow conduit having a horizontally disposed serrated lower edge 87, extends a substantial distance into the interior of the lower space within horizontal vessel 80. The level of molten sulfur shown at 88 normally coincides with the location of the edge of the downcomer and a substantial vapor space 89 is maintained above that sulfur level.

Each upper tray is constructed with a downcomer skirt 90 spaced from the wall of the column in order to provide a passage 91 through which molten sulfur may travel downwardly and gases may travel upwardly. Moreover, each upper tray is disposed with respect to the adjacent lower tray so that gas travelling upwardly will be trapped beneath the tray and be forced to bubble under the skirt of that tray in order to continue its upper travel. For the purpose of providing an elongated path of travel of such gas an imperforate baffle 92 is mounted under each tray and spaced therefrom, the lower edge of the baffle preferably extending well below the surface of the adjacent bath of sulfur. Accordingly, a series of vapor spaces is provided corresponding to the region under each tray and at the same time a series of levels of molten sulfur is provided corresponding to the lower edges of the skirts of these trays.

Figure 4:
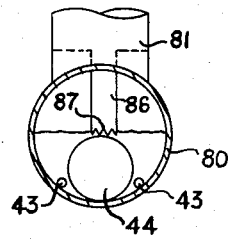
Fig. 4 is a sectional view taken on line 4—4 of Fig. 2.

The start-up heating unit 44 preferably is insertable into the lower portion 80 of the reactor vessel from one end and is mounted well below the normal level 88 of the sulfur therein. The hydrogen gas sparger 43 may be insertable into the vessel from the other end and adapted to introduce gas near the bottom of the vessel, as best shown in Fig. 4. The vessel also is provided with a sulfur outlet 45 adapted to be connected to conduit 11 leading to the heat exchanger 12. Preferably the entire reactor vessel is insulated as indicated diagrammatically at 46.

With the apparatus as thus described, the process may be conducted as follows: With a body of molten sulfur at about 850° F. in the lower portion 80 of the reactor vessel, hydrogen at about atmospheric temperature is permitted to bubble therethrough and to rise into vapor space 89. During its residence in this vapor space and its contact with the molten sulfur, the hydrogen reactant is preheated to a reaction temperature of about 850° F.; is thoroughly mingled with gaseous sulfur vapor from the sulfur bath; and begins its reaction with the gaseous sulfur vapor with a concomitant evolution of exothermic heat.

The preheated hydrogen and other gases in vapor space 89 are under pressure sufficiently greater than the pressure for which the system valve 77 is set, so that the gaseous mixture bubbles around serrated edge 87 of the downcomer from the lowest tray 82 and moves into the next reaction zone 93. Under the pressure and temperature conditions found therein the exothermic reaction of hydrogen and vaporized sulfur continues to take place with the evolution of heat which is transferred to the sulfur bath on tray 82 by the tray and column structure, and by the hot gases as they bubble through the bath. Since the reactor vessel preferably is insulated, substantially all of the heat generated is transferred to the molten sulfur.

In the hot reaction zones 89 and 93 a large percentage of the available hydrogen is reacted, but the mixture of gases and vaporized sulfur bubbling under the skirt 90 of tray 83 still contains a small amount of unreacted hydrogen. This mixture passing through the bath of molten sulfur in passage 91 is then entrapped beneath tray 84 in the adjacent hot reaction zone 94 wherein the exothermic reaction is continued and a substantial amount of the residual hydrogen is reacted. In a similar manner the mixture then passes under the skirt of tray 84 into the next reaction zone 95, under tray 85, and from thence into the successive vapor spaces under the upper trays until finally the gases are led into outlet conduit 50. In general from about 90 to 96% of the hydrogen supplied through sparger 43 is reacted by the time it reaches the conduit 50.

Depending upon the size and design of the structure, the exothermic reaction is usually completed after passage of the reactants through vapor space 95 and subsequent contact of the gases and liquid sulfur serves primarily a heat exchange purpose.

Gases and vaporized sulfur flowing from the final space in which the exothermic reaction occurs encounter progressively cooler sulfur which has a temperature gradient, for example: from about 260° F. in the uppermost tray to about 850° F. in tray 85.

In its contact therewith the formed hydrogen sulfide is progressively lowered in temperature by losing its sensible heat and upon entering conduit 50 and coolers 51 and 52 its temperature has been reduced to about 275° F. In this way the cooling load of the apparatus is reduced while at the same time the gases are still hot enough to prevent any sulfur from solidifying in the conduits. By removing the gases at this lowered temperature a major reduction in the amount of vaporized sulfur swept from the reactor vessel also is achieved when compared with previous equipment in which the gases left the vessel at much higher temperatures.

Since the molten sulfur supplied from conduit 16 and passing through the reactor vessel must flow readily and must pass through the normally extremely viscous range of 366°–370° F., the operation described above would be impossible were it not for the presence of hydrogen sulfide in that liquid sulfur between the tray 85 and the sulfur supply conduit 16. Due, however, to the countercurrent flow of the hydrogen sulfide gas in contact therewith and the resulting solution of hydrogen sulfide therein, the liquid sulfur remains free flowing while passing through the critical temperature range. Furthermore, it is found that a sufficient, but small, residue of hydrogen sulfide remains in the molten sulfur, leaving the bottom of the reactor vessel through outlet 11, so that pump 14 can move the relatively cool liquid sulfur even though it again passes through the critical temperature range while in heat exchanger 12.

Figure 6:
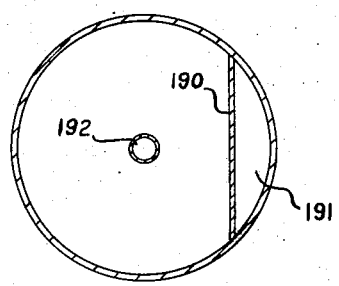
Fig. 6 is a sectional view taken on line 6—6 of Fig. 5.
Figure 7:
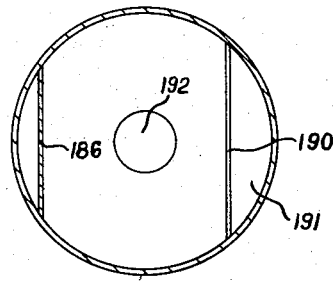
Fig. 7 is a sectional view taken on line 7—7 of Fig. 5.

As will be apparent to those skilled in the art, the process may be conducted in properly designed reactors other than the novel reactor shown in Fig. 2. For example, in Fig. 5, a reactor which is designed to operate in unflooded condition is shown. A vertical column 110 is shown, at the bottom of which a sulfur outlet 111 is adapted to lead to heat exchanger 12, and from the top of which a gas outlet 150 is adapted to lead to the coolers, all as shown in the system found in Fig. 1. The hydrogen sparger 143 may receive its gas from compressor 40 through a hydrogen gas start-up heater, not shown, adapted to heat the gas externally to reaction temperature at the beginning of the production operation. Thereafter, such gas heater may be by-passed and the gas supplied at atmospheric temperature, and under the desired pressure, to a point well below the surface 188 of the bath of molten sulfur. After the reaction has been initiated no further need exists for externally supplied heat, as is also the case of the electrical heater shown in Fig. 2, and which electrical heater also is made inoperative after the reaction begins in the reactor vessel 10. A liquid level controller 127 is provided to insure the maintenance of the proper level of molten sulfur, which controller is operatively connected to the make up pump 25 in the manner shown in Fig. 1. Also inlet conduit 116 supplies the sulfur from the make up pump to the top tray of the column Lower tray 183 is formed with an overflow weir 190, leaving a passage 191 between the weir and the column wall as shown in Fig. 6. In addition the tray is provided with any conventional bubble cap construction 192 and above the tray a reaction zone 193 is disposed. From the tray 184 immediately above, a baffle 186 extends downwardly to a plane below the plane of the top of weir 190. Similar trays 184, 185, 196, 197, 198 and 199 with similar bubble caps, weirs and baffles, are mounted within the column 110, which column preferably is provided with external insulation, not shown. In general the trays are equally spaced from adjacent trays, but with a greater space being provided between the lowermost tray and the bottom of the column and between the uppermost tray and the top of the column. Vapor spaces 193, 200, 201, 202, 203, 204 and 205 are disposed above the respective trays.

Circulating liquid sulfur supplied from conduit 116 fills the top tray and thereafter pours over the top of the weir and fills the next lower tray, and progressively fills the lower trays and reaches the maintained level 188 in the bottom of the vessel, from which it is drawn through conduit 111. After the process is stabilized, hydrogen under pressure is preheated by contact with the sulfur at the bottom of the vessel and passes from space 189 through bubble cap 192 into space 193. In general the exothermic reaction is completed by the time the gases leave space 201 and thereafter the gases give up their sensible heat to the downflowing liquid sulfur. By means of the apparatus shown in Fig. 5 a heat balance may be maintained at a somewhat higher temperature than that used in the reactor of Fig. 2. For example, the sulfur withdrawn through conduit 111 may be in the order of 850–900° F., and that entering through conduit 116 may be in the order of 260–300° F. In the reaction zone 189 the temperature may be in the order of 850° F. while in zones 193 and 200 it may be in the order of 900° F. Since the exothermic reaction is substantially completed in zone 200 the temperature thereafter falls in successive later zones due to the transfer of the sensible heat of the gas to the countercurrently moving sulfur.

Other forms of gas and liquid contact apparatus, such as packed towers, may also be employed without departing from the invention, since the viscosity of the circulating sulfur presents no operating problem. Furthermore, if desired, the sulfur introduced from conduit 116 may be subdivided and led to more than one tray at a time by any appropriate piping arrangement, if such a flow is desirable for achieving any particular operating condition in the reactor vessel.

Having thus described the invention, it is realized that various modifications of the method and apparatus herein described may be made by those skilled in the art without departing from the spirit or intent of the invention set forth.

I claim:

1. The method of producing hydrogen sulfide by synthesis from its elements comprising, passing heated hydrogen gas and molten sulfur to and through a hot reaction zone, collecting a mixture of sulfur vapor and hydrogen gas in said zone and exothermically reacting the same, and cooling substantially all of the formed hydrogen sulfide to a temperature substantially below reaction temperature by heat exchange with molten sulfur entering the reaction zone.

2. The method of producing hydrogen sulfide by synthesis from its elements comprising, passing heated hydrogen gas and molten sulfur to and through a hot reaction zone, collecting a mixture of sulfur vapor and hydrogen gas in said zone and exothermically reacting the same, and heating the incoming hydrogen gas by heat exchange with molten sulfur leaving the reaction zone.

3. The method of producing hydrogen sulfide by synthesis from its elements comprising, passing heated hydrogen gas and molten sulfur to and through a hot reaction zone, collecting a mixture of sulfur vapor and hydrogen gas in said zone and exothermically reacting the same, cooling substantially all of the formed hydrogen sulfide by heat exchange with the molten sulfur entering the reaction zone, and heating the incoming hydrogen gas by heat exchange with the molten sulfur leaving the reaction zone.

4. The method of producing hydrogen sulfide by synthesis from its elements comprising, passing heated hydrogen gas and molten sulfur to and through a hot reaction zone, collecting a mixture of sulfur vapor and hydrogen gas in said zone and exothermically reacting the same, cooling the formed hydrogen sulfide gas by heat exchange with the molten sulfur entering the reaction zone, heating the incoming hydrogen gas by heat exchange with the molten sulfur leaving the reaction zone, and separately cooling the molten sulfur after said heating of the hydrogen gas and prior to said cooling of the formed hydrogen sulfide gas, said separate cooling taking place externally of said reaction zone.

5. The method as defined in claim 1, including passing the hydrogen gas and molten sulfur countercurrently through said reaction zone.

6. The method of claim 1, including passing the molten sulfur through the reaction zone in an amount greater than the amount required to combine with the hydrogen present and sufficient to maintain a stable temperature control in said synthesis reaction.

7. In a method for producing hydrogen sulfide by synthesis from its elements, the improvement in maintaining a heat balance comprising introducing hydrogen into a reaction zone, circulating molten sulfur, in excess of the stoichiometric amount required for the reaction, through said reaction zone in contact with said hydrogen and absorbing in said sulfur a sufficient amount of hydrogen sulfide to inhibit excessive viscosity of said sulfur, removing formed hydrogen sulfide from said reaction zone, cooling the hydrogen-sulfide-containing sulfur to a temperature below about 350° F., and reheating the cooled sulfur, said cooling taking place externally of said reaction zone.

8. The method of claim 7, including cooling the hydrogen sulfide leaving the reaction zone by passing the cooled hydrogen-sulfide-containing sulfur in heat exchange relation thereto thereby also reheating said sulfur.

9. The method of claim 7, including preheating the hydrogen entering the reaction zone by passing the heated hydrogen-sulfide-containing sulfur in heat exchange relation thereto.

10. The method of synthesizing hydrogen sulfide comprising establishing and maintaining a stream of liquid sulfur circulating in a closed circuit under pressure, introducing hydrogen gas into a body of said sulfur stream while at a reaction zone in said circuit, vaporizing sulfur in said reaction zone and reacting the introduced hydrogen and the vaporized sulfur to produce hot hydrogen sulfide, conducting the so produced hydrogen sulfide in intimate counter flow to the circulating sulfur stream approaching said reaction zone and thereby transferring heat to said sulfur from the hydrogen sulfide to cool the hydrogen sulfide to a lower temperature suitable for subsequent use of the hydrogen sulfide and to heat the circulating sulfur stream to vaporization temperature, and adding fresh sulfur to the circulating stream thereof at a point downstream from and externally of said reaction zone at which the hydrogen is introduced, said point being upstream of the point at which heat transfer from the hydrogen sulfide to the liquid sulfur occurs.

11. The method of synthesizing hydrogen sulfide comprising, mixing hydrogen gas with vaporized sulfur from a circulating body of molten sulfur and reacting the same to form hot hydrogen sulfide, said circulating body of sulfur containing a sufficient portion of formed hydrogen sulfide dissolved therein to insure ready flow throughout the path of travel of said body, heating make-up sulfur to a temperature at which molten pure sulfur will flow and mixing the same with the circulating body containing dissolved hydrogen sulfide, and conducting the mixed body of sulfur through a heat exchange zone in contact with substantially all of the undissolved hydrogen sulfide formed by said reaction while transferring heat from substantially all of the said undissolved hydrogen sulfide to said mixed body of sulfur.

12. A method of producing hydrogen sulfide by synthesis from its elements, which comprises establishing and maintaining a flow of molten sulfur through a reaction zone maintained under pressure and which zone constitutes part of a closed circuit through which said molten sulfur circulates to and from said zone, collecting vapor from said molten sulfur in said zone, introducing heated hydrogen gas into said zone and exothermically reacting it with said sulfur vapor to form hydrogen sulfide, withdrawing the formed hydrogen sulfide gas from said zone, effecting direct heat exchange contact between said introduced hydrogen gas and molten sulfur leaving said zone so as to heat said hydrogen gas and partially cool said sulfur, further cooling the sulfur after it leaves said zone and at a location in said circuit externally of said zone, and effecting direct heat exchange contact between the sulfur entering said zone and the formed hydrogen sulfide leaving said zone so as to cool the formed hydrogen sulfide and reheat the entering sulfur.

References Cited in the file of this patent

UNITED STATES PATENTS

| | | |
|---|---|---|
| 1,700,578 | Bacon | Jan. 29, 1929 |
| 2,214,859 | Maude et al. | Sept. 17, 1940 |
| 2,259,901 | Matheson | Oct. 21, 1941 |
| 2,497,095 | Nevins | Feb. 14, 1950 |
| 2,726,933 | Merriam et al. | Dec. 13, 1955 |

FOREIGN PATENTS

| | | |
|---|---|---|
| 558,432 | Germany | Sept. 7, 1932 |